United States Patent
Matsuo et al.

(10) Patent No.: US 12,191,446 B2
(45) Date of Patent: Jan. 7, 2025

(54) BINDER COMPOSITION FOR ALL-SOLID-STATE SECONDARY BATTERY

(71) Applicant: ZEON CORPORATION, Tokyo (JP)

(72) Inventors: Yusaku Matsuo, Tokyo (JP); Kenya Sonobe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 540 days.

(21) Appl. No.: 17/413,949

(22) PCT Filed: Dec. 5, 2019

(86) PCT No.: PCT/JP2019/047714
§ 371 (c)(1),
(2) Date: Jun. 15, 2021

(87) PCT Pub. No.: WO2020/137434
PCT Pub. Date: Jul. 2, 2020

(65) Prior Publication Data
US 2022/0045360 A1   Feb. 10, 2022

(30) Foreign Application Priority Data
Dec. 28, 2018   (JP) .................................. 2018-248081

(51) Int. Cl.
| | |
|---|---|
| *H01M 10/0565* | (2010.01) |
| *C08F 220/18* | (2006.01) |
| *C08K 5/134* | (2006.01) |
| *C08K 5/375* | (2006.01) |

(52) U.S. Cl.
CPC ... *H01M 10/0565* (2013.01); *C08F 220/1804* (2020.02); *C08K 5/134* (2013.01); *C08K 5/375* (2013.01); *H01M 2300/0082* (2013.01)

(58) Field of Classification Search
CPC combination set(s) only.
See application file for complete search history.

(56) References Cited

U.S. PATENT DOCUMENTS

| | | | |
|---|---|---|---|
| 6,268,087 B1 * | 7/2001 | Kim .................. | H01M 10/0525 429/231.95 |
| 10,910,651 B2 | 2/2021 | Murase et al. | |
| 2006/0205922 A1 * | 9/2006 | Nishio .............. | H01M 10/0565 528/425 |
| 2012/0009483 A1 * | 1/2012 | Chu ..................... | H01M 4/386 429/304 |
| 2014/0178756 A1 | 6/2014 | Ishii et al. | |
| 2015/0030922 A1 | 1/2015 | Kobayashi et al. | |
| 2016/0204468 A1 | 7/2016 | Makino et al. | |
| 2018/0254519 A1 | 9/2018 | Maeda et al. | |
| 2019/0229339 A1 | 7/2019 | Maeda et al. | |

FOREIGN PATENT DOCUMENTS

| | | | | |
|---|---|---|---|---|
| CN | 102473917 A | 5/2012 | | |
| CN | 103181008 A | 6/2013 | | |
| CN | 108701833 A | 10/2018 | | |
| JP | 2011054439 A | 3/2011 | | |
| JP | 2013008611 A | 1/2013 | | |
| JP | 2013055049 A | 3/2013 | | |
| JP | 2013179040 A | 9/2013 | | |
| JP | 2015088480 A | 5/2015 | | |
| WO | WO-2012023626 A1 * | 2/2012 | ............ | H01G 11/28 |
| WO | 2015046313 A1 | 4/2015 | | |
| WO | 2017047378 A1 | 3/2017 | | |
| WO | WO2017/155059 * | 9/2017 | | |
| WO | 2018047821 A1 | 3/2018 | | |
| WO | 2018088306 A | 6/2018 | | |

OTHER PUBLICATIONS

Machine translation of WO 2012-023626, published on Feb. 23, 2012 (Year: 2012).*
Aug. 30, 2022, the Extended European Search Report issued by the European Patent Office in the corresponding European Patent Application No. 19905923.9.
Jun. 16, 2021, International Preliminary Report on Patentability issued in the International Patent Application No. PCT/JP2019/047714.
Jan. 21, 2020, International Search Report issued in the International Patent Application No. PCT/JP2019/047714.

* cited by examiner

*Primary Examiner* — Anca Eoff
(74) *Attorney, Agent, or Firm* — KENJA IP LAW PC

(57) ABSTRACT

Provided is a binder composition for an all-solid-state secondary battery that can yield an all-solid-state secondary battery having excellent output characteristics and high-temperature cycle characteristics. The binder composition for an all-solid-state secondary battery contains a polymer, an anti-aging agent, and an organic solvent. The polymer includes a (meth)acrylic acid ester monomer unit in a proportion of not less than 25 mass % and not more than 95 mass % and has a gel content of 50 mass % or less. The anti-aging agent is contained in an amount of not less than 0.005 parts by mass and not more than 0.5 parts by mass per 100 parts by mass of the polymer.

12 Claims, No Drawings

BINDER COMPOSITION FOR ALL-SOLID-STATE SECONDARY BATTERY

CROSS-REFERENCE TO RELATED APPLICATIONS

This application is a National Stage entry under 37 CFR 371 of the International Application No. PCT/JP2019/047714 filed on Dec. 5, 2019, which claims benefit to application No. 2018-248081 filed on Dec. 28, 2018, in Japan, the entire disclosures of which are incorporated herein by reference.

TECHNICAL FIELD

The present disclosure relates to a binder composition for an all-solid-state secondary battery, a slurry composition for an all-solid-state secondary battery solid electrolyte layer, a slurry composition for an all-solid-state secondary battery electrode, a solid electrolyte layer for an all-solid-state secondary battery, an electrode for an all-solid-state secondary battery, and an all-solid-state secondary battery.

BACKGROUND

Demand for secondary batteries such as lithium ion secondary batteries has been increasing in recent years for various applications such as mobile information terminals, mobile electronic devices, and other mobile terminals, and also domestic small power storage devices, motorcycles, electric vehicles, and hybrid electric vehicles. The widespread use of secondary batteries in such applications has been accompanied by demand for further improvement of secondary battery safety.

For this reason, all-solid-state secondary batteries in which a solid electrolyte is used instead of an organic solvent electrolyte having high flammability and high danger of ignition upon leakage are attracting attention as secondary batteries having high safety.

An all-solid-state secondary battery is a secondary battery that includes a solid electrolyte layer between a positive electrode and a negative electrode. The electrodes (positive electrode and negative electrode) can each be formed by applying a slurry composition containing an electrode active material (positive electrode active material or negative electrode active material), a binder, and a solid electrolyte onto a current collector and then drying the slurry composition to provide an electrode mixed material layer (positive electrode mixed material layer or negative electrode mixed material layer) on the current collector, and the solid electrolyte layer can be formed by applying a slurry composition containing a binder and a solid electrolyte onto an electrode or a releasable substrate and then drying the slurry composition. The all-solid-state secondary battery is then produced by stacking the positive electrode and the negative electrode such that the positive electrode mixed material layer of the positive electrode and the negative electrode mixed material layer of the negative electrode are in opposition via the solid electrolyte layer, and generally performing press processing thereof.

Attempts are being made to improve the performance of all-solid-state secondary batteries through strategies related to binders contained in slurry compositions that are for electrodes or solid electrolyte layers.

Patent Literature (PTL) 1 discloses that output characteristics and charge/discharge cycle characteristics of an all-solid-state secondary battery are improved through the combined use of a polymer having a particle structure and a water-soluble polymer in a binder.

PTL 2 and 3 disclose that a rise of interface resistance related to a solid electrolyte layer is suppressed regardless of pressing by using a polymer that includes a soft segment and hard segment, selected from an amide bond, a urea bond, a urethane bond, and an imide bond, in a binder.

PTL 4 discloses that oxidative deterioration of a solid electrolyte or binder is prevented and reduction of performance during long-term use is inhibited by using a polyurethane, polyurea, polyamide, polyimide, and/or polyester in a binder and by compounding an antioxidant.

CITATION LIST

Patent Literature

PTL 1: WO2017/47378A1
PTL 2: WO2015/46313A1
PTL 3: JP2015-88480A
PTL 4: JP2018-88306A

SUMMARY

Technical Problem

However, PTL 2 and 3 require the production of a specific polymer, which has a large burden in implementation, and PTL 4 involves the compounding of a large amount of an antioxidant relative to a binder in order to prevent oxidation, the influence of which on output characteristics and the like of an all-solid-state secondary battery may be problematic.

On the other hand, output characteristics and charge/discharge cycle characteristics that are an object of PTL 1 are characteristics of particular interest among characteristics of all-solid-state secondary batteries for which adoption is expected in electric vehicles, large-scale storage batteries, and so forth, and there is demand for further improvement of cycle characteristics in a high-temperature region.

An object of the present disclosure is to provide a binder composition for an all-solid-state secondary battery that can yield an all-solid-state secondary battery having excellent output characteristics and high-temperature cycle characteristics.

Solution to Problem

The inventors discovered that the object set forth above can be achieved by using a specific polymer as a binder and by combining a specific amount of an anti-aging agent therewith in a binder composition for an all-solid-state secondary battery. In this manner, the inventors completed the present disclosure.

Specifically, the present disclosure advantageously solves the problem set forth above, and relates to a binder composition for an all-solid-state secondary battery comprising a polymer, an anti-aging agent, and an organic solvent, wherein
the polymer includes a (meth)acrylic acid ester monomer unit in a proportion of not less than 25 mass % and not more than 95 mass % and has a gel content of 50 mass % or less, and
the anti-aging agent is contained in an amount of not less than 0.005 parts by mass and not more than 0.5 parts by mass per 100 parts by mass of the polymer.

The polymer including a (meth)acrylic acid ester monomer unit in a proportion of not less than 25 mass % and not more than 95 mass % and having a gel content of 50 mass % or less is also referred to below as a "(meth)acrylic polymer", and the anti-aging agent in an amount of not less than 0.005 parts by mass and not more than 0.5 parts by mass per 100 parts by mass of the polymer is also referred to below as a "specific amount of anti-aging agent".

The term "binder composition for an all-solid-state secondary battery" as used in the present specification refers to a material that is used in production of a slurry composition for an all-solid-state secondary battery (slurry composition for an all-solid-state secondary battery solid electrolyte layer or slurry composition for an all-solid-state secondary battery electrode) and that contains a binder and an organic solvent. Features of the presently disclosed binder composition for an all-solid-state secondary battery are that the binder is the aforementioned (meth)acrylic polymer and that the specific amount of anti-aging agent is compounded therein.

Although the mechanism by which, in an all-solid-state secondary battery, the presently disclosed binder composition for an all-solid-state secondary battery yields an all-solid-state secondary battery having excellent output characteristics and high-temperature cycle characteristics is unclear, the mechanism can be presumed to be as follows.

The presently disclosed binder composition for an all-solid-state secondary battery imparts dispersibility to a slurry composition for an all-solid-state secondary battery solid electrolyte layer or a slurry composition for an all-solid-state secondary battery electrode in which the binder composition is used based mainly on the (meth)acrylic polymer and imparts plasticity to a layer formed using either of these slurry compositions based mainly on the specific amount of anti-aging agent. As a consequence, leveling performance during slurry composition application improves, and close adherence to a substrate of a layer formed after slurry composition drying also improves. This brings about excellent output characteristics in an all-solid-state secondary battery.

The provision of plasticity through the specific amount of anti-aging agent is due to sliding between components in a layer formed using the aforementioned slurry composition being improved by the specific amount of anti-aging agent. Through the same action, the specific amount of anti-aging agent reduces internal stress of each layer when pressure is applied to each layer in a battery production process. This makes it possible to avoid a situation in which the presence of internal stress in each layer becomes noticeable and cycle characteristics deteriorate when charge/discharge cycles are repeated, and brings about improvement of cycle characteristics of an all-solid-state secondary battery in a high-temperature region.

As described above, internal stress in each layer during press processing can be reduced by using the presently disclosed binder composition for an all-solid-state secondary battery. Moreover, since the close adherence of a layer formed after slurry composition drying improves, it is possible to reduce pressure during press processing and also to relatively reduce the amount of a binder and relatively increase the amount of an electrode active material and/or a solid electrolyte. In this manner, the presently disclosed binder composition for an all-solid-state secondary battery is effective for improving battery performance (pressability) under the premise of all-solid-state secondary battery production with press processing.

In the present specification, "(meth)acryl" is used to indicate "acryl and/or methacryl".

Moreover, the term "monomer unit" as used in the present specification means a "structural unit derived from that monomer". Furthermore, the phrase "includes a monomer unit" means that "a structural unit derived from that monomer is included in a polymer obtained using the monomer", and the proportional content of a monomer unit is expressed by the proportion constituted by that monomer unit when the overall polymer is taken to be 100 mass %.

The "gel content" referred to in the present specification can be measured by a method described in the EXAMPLES section of the present specification.

In the presently disclosed binder composition for an all-solid-state secondary battery, the polymer preferably further includes an $\alpha,\beta$-unsaturated nitrile monomer unit. By using a polymer that further includes an $\alpha,\beta$-unsaturated nitrile monomer unit as a binder, it is possible to impart even better dispersibility to a slurry composition, and to thereby effectively improve output characteristics. It is more preferable that a polymer including an $\alpha,\beta$-unsaturated nitrile monomer unit in a proportion of not less than 2 mass % and not more than 30 mass % is used in the presently disclosed binder composition for an all-solid-state secondary battery.

In the presently disclosed binder composition for an all-solid-state secondary battery, the polymer preferably further includes a hydrophobic monomer unit. The term "hydrophobic monomer unit" as used in the present specification means a "monomer unit for which the monomer itself has a solubility (25° C.) of 1 g/1 L or less in water and that is a monomer unit other than the (meth)acrylic acid ester monomer unit and the $\alpha,\beta$-unsaturated nitrile monomer unit". By using a polymer that further includes a hydrophobic monomer unit as a binder, it is possible to impart even better dispersibility to a slurry composition, and to thereby effectively improve output characteristics. It is more preferable that a polymer including a hydrophobic monomer unit in a proportion of not less than 3 mass % and not more than 60 mass % is used in the presently disclosed binder composition for an all-solid-state secondary battery.

In the presently disclosed binder composition for an all-solid-state secondary battery, the anti-aging agent is preferably at least one selected from the group consisting of a phenolic anti-aging agent and an organophosphorus anti-aging agent. By using these anti-aging agents, it is possible to effectively improve pressability, and to thereby further improve high-temperature cycle characteristics.

The present disclosure also relates to a slurry composition for an all-solid-state secondary battery solid electrolyte layer comprising: any one of the binder compositions for an all-solid-state secondary battery set forth above; and a solid electrolyte. The presently disclosed slurry composition for an all-solid-state secondary battery solid electrolyte layer has excellent dispersibility and pressability, and can bring about excellent output characteristics and high-temperature cycle characteristics in an all-solid-state secondary battery.

The present disclosure also relates to a slurry composition for an all-solid-state secondary battery electrode comprising: any one of the binder compositions for an all-solid-state secondary battery set forth above; an electrode active material; and a solid electrolyte. The presently disclosed slurry composition for an all-solid-state secondary battery electrode has excellent dispersibility and pressability, and can bring about excellent output characteristics and high-temperature cycle characteristics in an all-solid-state secondary battery.

The present disclosure also relates to a solid electrolyte layer for an all-solid-state secondary battery formed using the slurry composition for an all-solid-state secondary battery solid electrolyte layer set forth above. The presently disclosed solid electrolyte layer for an all-solid-state secondary battery can bring about excellent output characteristics and high-temperature cycle characteristics in an all-solid-state secondary battery.

The present disclosure also relates to an electrode for an all-solid-state secondary battery comprising an electrode mixed material layer formed using the slurry composition for an all-solid-state secondary battery electrode set forth above. The presently disclosed electrode for an all-solid-state secondary battery can bring about excellent output characteristics and high-temperature cycle characteristics in an all-solid-state secondary battery.

A presently disclosed all-solid-state secondary battery comprises either or both of: the solid electrolyte layer for an all-solid-state secondary battery set forth above; and the electrode for an all-solid-state secondary battery set forth above, and has excellent output characteristics and high-temperature cycle characteristics.

Advantageous Effect

According to the present disclosure, a binder composition for an all-solid-state secondary battery that can yield an all-solid-state secondary battery having excellent output characteristics and cycle characteristics is provided.

Moreover, according to the present disclosure, a slurry composition for an all-solid-state secondary battery solid electrolyte layer, a slurry composition for an all-solid-state secondary battery electrode, a solid electrolyte layer for an all-solid-state secondary battery, and an electrode for an all-solid-state secondary battery that can yield an all-solid-state secondary battery having excellent output characteristics and cycle characteristics are provided.

The presently disclosed all-solid-state secondary battery has excellent output characteristics and high-temperature cycle characteristics, and is highly useful in industry.

DETAILED DESCRIPTION

The following provides a detailed description of embodiments of the present disclosure.

The presently disclosed binder composition for an all-solid-state secondary battery is used as a material in production of a slurry composition for an all-solid-state secondary battery (slurry composition for an all-solid-state secondary battery solid electrolyte layer or slurry composition for an all-solid-state secondary battery electrode).

The presently disclosed slurry composition for an all-solid-state secondary battery solid electrolyte layer is used in formation of a solid electrolyte layer of an all-solid-state secondary battery, and the presently disclosed slurry composition for an all-solid-state secondary battery electrode is used in formation of an electrode mixed material layer (positive electrode mixed material layer or negative electrode mixed material layer) of an all-solid-state secondary battery.

The presently disclosed electrode (positive electrode or negative electrode) for an all-solid-state secondary battery includes the aforementioned electrode mixed material layer (positive electrode mixed material layer or negative electrode mixed material layer).

The presently disclosed all-solid-state secondary battery includes either or both of the presently disclosed solid electrolyte layer for an all-solid-state secondary battery and the presently disclosed electrode for an all-solid-state secondary battery.

(Binder Composition for All-Solid-State Secondary Battery)

The presently disclosed binder composition for an all-solid-state secondary battery is a binder composition for an all-solid-state secondary battery that contains a polymer, an anti-aging agent, and an organic solvent, in which the polymer includes a (meth)acrylic acid ester monomer unit in a proportion of not less than 25 mass % and not more than 95 mass % and has a gel content of 50 mass % or less, and in which the anti-aging agent is contained in an amount of not less than 0.005 parts by mass and not more than 0.5 parts by mass per 100 parts by mass of the polymer.

<(Meth)Acrylic Polymer>

In the present disclosure, the polymer ((meth)acrylic polymer) that includes a (meth)acrylic acid ester monomer unit in a proportion of not less than 25 mass % and not more than 95 mass % and has a gel content of 50 mass % or less is a binder component. The binder component is a component for binding components contained in a solid electrolyte layer to one another or for binding components contained in an electrode mixed material layer to one another and holding these components so that they do not become detached from the mixed material layer. One (meth)acrylic polymer may be used, or two or more (meth)acrylic polymers may be used in combination in a freely selected ratio.

The (meth)acrylic acid ester monomer in the (meth)acrylic acid ester monomer unit may, for example, be an acrylic acid alkyl ester such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, nonyl acrylate, decyl acrylate, lauryl acrylate, n-tetradecyl acrylate, stearyl acrylate, or 2-ethylhexyl acrylate; an acrylic acid alkoxy ester such as 2-methoxyethyl acrylate or 2-ethoxyethyl acrylate; a 2-(perfluoroalkyl)ethyl acrylate such as 2-(perfluorobutyl)ethyl acrylate or 2-(perfluoropentyl)ethyl acrylate; a methacrylic acid alkyl ester such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, nonyl methacrylate, decyl methacrylate, lauryl methacrylate, tridecyl methacrylate, n-tetradecyl methacrylate, stearyl methacrylate, or 2-ethylhexyl methacrylate; a methacrylic acid alkoxy ester such as 2-methoxyethyl methacrylate or 2-ethoxyethyl methacrylate; a 2-(perfluoroalkyl) ethyl methacrylate such as 2-(perfluorobutyl)ethyl methacrylate or 2-(perfluoropentyl)ethyl methacrylate; benzyl acrylate; benzyl methacrylate; or the like. The term "(meth) acrylic acid ester monomer" is also inclusive of diesters of α,β-ethylenically unsaturated dicarboxylic acids, examples of which include lower alkyl diesters of itaconic acid such as diethyl itaconate and dibutyl itaconate. Of these (meth) acrylic acid ester monomers, methyl acrylate, ethyl acrylate, methyl methacrylate, 2-ethylhexyl acrylate, n-butyl acrylate, t-butyl acrylate, and dibutyl itaconate are preferable, and ethyl acrylate, n-butyl acrylate, and t-butyl acrylate are more preferable. One of these (meth)acrylic acid ester monomers may be used, or two or more of these (meth)acrylic acid ester monomers may be used in combination in a freely selected ratio.

The proportional content of the (meth)acrylic acid ester monomer unit in the (meth)acrylic polymer is not less than 25 mass % and not more than 95 mass %. From a viewpoint of obtaining a good dispersion state of a solid electrolyte or the like in a slurry composition in which the binder composition is used and excellent leveling performance, and also in terms of advantageousness for improving output characteristics, the proportional content of the (meth)acrylic acid ester monomer unit is preferably 28 mass % or more, more preferably 30 mass % or more, and even more preferably 32 mass % or more, and is preferably 90 mass % or less, more preferably 85 mass % or less, and even more preferably 83 mass % or less.

The gel content of the (meth)acrylic polymer is 50 mass % or less, more preferably 10 mass % or less, and particularly preferably 0%. When the gel content is not more than any of the upper limits set forth above, the binder composition dissolves readily in an organic solvent, and a good dispersion state of a solid electrolyte or the like in a slurry composition can easily be obtained. The gel content can be controlled through the types and amounts of monomers in the polymer, the type and amount of a chain transfer agent used in polymerization, the polymerization temperature, and so forth.

In the present disclosure, it is important that the (meth) acrylic polymer includes the (meth)acrylic acid ester monomer unit in a proportion of not less than 25 mass % and not more than 95 mass % and has a gel content of 50 mass % or less. So long as this is satisfied, the types and proportional contents of monomer units other than the (meth)acrylic acid ester monomer unit can be freely selected.

The (meth)acrylic polymer preferably further includes an α,β-unsaturated nitrile monomer unit. The α,β-unsaturated nitrile monomer may be acrylonitrile, methacrylonitrile, α-chloroacrylonitrile, α-ethylacrylonitrile, or the like. Of these α,β-unsaturated nitrile monomers, acrylonitrile and methacrylonitrile are preferable, and acrylonitrile is more preferable. One α,β-unsaturated nitrile monomer may be used, or two or more α,β-unsaturated nitrile monomers may be used in combination in a freely selected ratio.

The proportional content of the α,β-unsaturated nitrile monomer unit is preferably 2 mass % or more, more preferably 3 mass % or more, and particularly preferably 4 mass % or more, and is preferably 30 mass % or less, more preferably 28 mass % or less, and particularly preferably 26 mass % or less. When the proportional content of the α,β-unsaturated nitrile monomer unit is not less than any of the lower limits set forth above, a solid electrolyte or the like has an even better dispersion state in a slurry composition in which the binder composition is used, and output characteristics can be effectively improved. When the proportional content of the α,β-unsaturated nitrile monomer unit is not more than any of the upper limits set forth above, this is advantageous in terms that the polymer dissolves readily in an organic solvent.

The (meth)acrylic polymer can further include a hydrophobic monomer unit. The hydrophobic monomer unit may be an aromatic vinyl monomer unit, a conjugated diene monomer unit, an olefin monomer unit, or the like. The term "hydrophobic monomer unit" is considered to not be inclusive of a (meth)acrylic acid ester monomer unit or an α,β-unsaturated nitrile monomer unit. One type of hydrophobic monomer unit may be included, or two or more types of hydrophobic monomer units may be included in combination in a freely selected ratio.

The aromatic vinyl monomer may be an aromatic vinyl monomer such as styrene, chlorostyrene, vinyltoluene, t-butylstyrene, vinylbenzoic acid, methyl vinylbenzoate, vinylnaphthalene, chloromethylstyrene, hydroxymethylstyrene, α-methylstyrene, or divinylbenzene. Of these aromatic vinyl monomers, styrene and vinylnaphthalene are preferable.

The conjugated diene monomer may be a conjugated diene compound having a carbon number of 4 or more such as 1,3-butadiene, isoprene, 2,3-dimethyl-1,3-butadiene, or 1,3-pentadiene. Of these conjugated diene monomers, 1,3-butadiene and isoprene are preferable.

The olefin monomer may be a 1-olefin monomer, examples of which include ethylene, propylene, and 1-butene, with ethylene being preferable. The olefin monomer unit may be a structural unit obtained through hydrogenation of a conjugated diene monomer unit (i.e., may be a hydrogenated conjugated diene unit). Of such structural units, a hydrogenated 1,3-butadiene unit and a hydrogenated isoprene unit, which are structural units obtained through hydrogenation of a 1,3-butadiene monomer unit and an isoprene monomer unit, respectively, are preferable.

From a viewpoint of imparting even better dispersibility to a solid electrolyte or the like in a slurry composition and further improving output characteristics, the proportional content of the hydrophobic monomer unit is preferably 3 mass % or more, more preferably 5 mass % or more, even more preferably 12 mass % or more, and particularly preferably 14 mass % or more, and is preferably 60 mass % or less, more preferably 55 mass % or less, even more preferably 50 mass % or less, and particularly preferably 45 mass % or less. When the upper limit and lower limit are within any of the ranges set forth above, it is easy to improve dispersibility of an electrode active material and a conductive material upon use in a slurry composition for an all-solid-state secondary battery electrode.

The (meth)acrylic polymer may include other monomer units besides the various monomer units described above. Examples of other monomer include unsaturated carboxylic acid monomers such as acrylic acid, methacrylic acid, itaconic acid, and fumaric acid; amide monomers such as acrylamide, N-methylolacrylamide, and acrylamido-2-methylpropane sulfonic acid; halogen atom-containing monomers such as vinyl chloride and vinylidene chloride; vinyl ester monomers such as vinyl acetate, vinyl propionate, vinyl butyrate, and vinyl benzoate; vinyl ether monomers such as methyl vinyl ether, ethyl vinyl ether, and butyl vinyl ether; vinyl ketone monomers such as methyl vinyl ketone, ethyl vinyl ketone, butyl vinyl ketone, hexyl vinyl ketone, and isopropenyl vinyl ketone; heterocycle-containing vinyl monomers such as N-vinylpyrrolidone, vinylpyridine, and vinylimidazole; and glycidyl group-containing monomers such as glycidyl acrylate, glycidyl methacrylate, and allyl glycidyl ether. One of these types of other monomer units may be included, or two or more of these types of other monomer units may be included in combination in a freely selected ratio.

The (meth)acrylic polymer can be composed of not less than 25 mass % and not more than 95 mass % of the (meth)acrylic acid ester monomer unit and of at least one selected from the α,β-unsaturated nitrile monomer unit, the hydrophobic monomer unit, and the other monomer units. Preferable amounts and types of the α,β-unsaturated nitrile monomer unit, the hydrophobic monomer unit, and the other monomer units are as described above.

The weight-average molecular weight of the (meth)acrylic polymer is preferably 50,000 or more, and more preferably 100,000 or more from a viewpoint of slurry preservation stability, and is preferably 5,000,000 or less, and more preferably 2,000,000 or less from a viewpoint of slurry dispersibility.

The "weight-average molecular weight" referred to in the present specification can be measured by a method described in the EXAMPLES section of the present specification.

No specific limitations are placed on the production method of the (meth)acrylic polymer, and the (meth)acrylic polymer can be obtained by polymerizing a monomer composition that contains the monomers described above. The proportional content of each monomer in the monomer composition can be set based on the proportional content of each type of monomer unit in the polymer.

The method of polymerization is not specifically limited and may be solution polymerization, suspension polymerization, bulk polymerization, emulsion polymerization, or the like. Emulsifiers, polymerization initiators, and the like can be used in each of these polymerization methods as necessary. The olefin monomer unit can be introduced through hydrogenation of a conjugated diene monomer unit. A commonly known method can be adopted as the method of hydrogenation without any specific limitations.

<Anti-Aging Agent>

The presently disclosed binder composition for an all-solid-state secondary battery contains an anti-aging agent. The anti-aging agent may be a phenolic anti-aging agent, an organophosphorus anti-aging agent, an amine anti-aging agent, a quinone anti-aging agent, a sulfuric anti-aging agent, a phenothiazine anti-aging agent, or the like without any specific limitations. Phenolic anti-aging agents and organophosphorus anti-aging agents are preferable, and phenolic anti-aging agents and phosphite anti-aging agents are more preferable in terms that even better close adherence is obtained and pressability can be effectively improved. One anti-aging agent may be used, or two or more anti-aging agents may be used in combination in a freely selected ratio. The anti-aging agent preferably includes at least one selected from a phenolic anti-aging agent and an organophosphorus anti-aging agent, and more preferably includes at least a phenolic anti-aging agent.

Examples of phenolic anti-aging agents include sulfur-free phenolic anti-aging agents such as 2,6-di-t-butyl-4-methylphenol, 2,6-di-t-butylphenol, butylhydroxyanisole, 2,6-di-t-butyl-α-dimethylamino-p-cresol, 3-(3,5-di-t-butyl-4-hydroxyphenyl)propionic acid octadecyl ester (alternative name: octadecyl 3-(3,5-di-t-butyl-4-hydroxyphenyl)propionate), styrenated phenol, 2,2'-methylenebis(6-α-methyl-benzyl-p-cresol), 4,4'-methylenebis(2,6-di-t-butylphenol), 2,2'-methylenebis(4-methyl-6-t-butylphenol), alkylated bisphenol, butylated reaction product of p-cresol and dicyclopentadiene, pentaerythritol tetrakis[3-(3,5-di-t-butyl-4-hydroxyphenyl)propionate], and 2,4,6-tris(3',5'-di-t-butyl-4'-hydroxybenzyl)mesitylene; and sulfur-containing phenolic anti-aging agents such as 2,2'-thiobis(4-methyl-6-t-butylphenol), 4,4'-thiobis(6-t-butyl-o-cresol), 4,6-bis(octyl-thiomethyl)-o-cresol (alternative name: 2,4-bis(octylthiomethyl)-6-methylphenol), and 4-[[4,6-bis(octylthio)-1,3,5-triazin-2-yl]amino]-2,6-di-t-butylphenol (alternative name: 2,6-di-t-butyl-4-(4,6-bis(octylthio)-1,3,5-triazin-2-ylamino) phenol). 2,6-Di-t-butyl-4-methylphenol and 3-(3,5-di-t-butyl-4-hydroxyphenyl)propionic acid octadecyl ester are preferable as sulfur-free phenolic anti-aging agents, whereas 4,6-bis(octylthiomethyl)-o-cresol and 2,6-di-t-butyl-4-(4,6-bis(octylthio)-1,3,5-triazin-2-ylamino)phenol are preferable as sulfur-containing phenolic anti-aging agents. One of these phenolic anti-aging agents may be used, or two or more of these phenolic anti-aging agents may be used in combination in a freely selected ratio. Moreover, a sulfur-containing phenolic anti-aging agent and a sulfur-free phenolic anti-aging agent may be used together.

Examples of organophosphorus anti-aging agents include phosphite anti-aging agents such as triphenyl phosphite, diphenyl isodecyl phosphite, phenyl diisodecyl phosphite, 4,4'-butylidene-bis(3-methyl-6-t-butylphenyl ditridecyl) phosphite, 3,9-bis(octadecyloxy)-2,4,8,10-tetraoxa-3,9-diphosphaspiro[5.5]undecane (alternative name: cyclic neopentanetetrayl bis(octadecyl phosphite)), tris(nonylphenyl phosphite), tris(mono-(or di-) nonylphenyl) phosphite, diisodecyl pentaerythritol diphosphite, tris(2,4-di-t-butylphenyl) phosphite, cyclic neopentanetetrayl bis(2,4-di-t-butylphenyl) phosphite, cyclic neopentanetetrayl bis(2,6-di-t-butyl-4-methylphenyl) phosphite, and 2,2-methylenebis(4,6-di-t-butylphenyl)octyl phosphite; and phosphaphenanthrene ring-containing anti-aging agents such as 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, and 10-decyloxy-9,10-dihydro-9-oxa-10-phosphaphenanthrene-10-oxide. A phosphite anti-aging agent is preferable, with a phosphite anti-aging agent including a long chain alkyl (for example, having a carbon number of 9 or more) being more preferable from a viewpoint of improving pressability, examples of which include diphenyl isodecyl phosphite, phenyl diisodecyl phosphite, 4,4'-butylidene-bis(3-methyl-6-t-butylphenyl ditridecyl) phosphite, 3,9-bis(octadecyloxy)-2,4,8,10-tetraoxa-3,9-diphosphaspiro[5.5]undecane, tris(nonylphenyl phosphite), tris(mono-(or di-) nonylphenyl) phosphite, and diisodecyl pentaerythritol diphosphite.

Examples of amine anti-aging agents include bis(4-t-butylphenyl)amine, poly(2,2,4-trimethyl-1,2-dihydroquinoline), 6-ethoxy-1,2-dihydro-2,2,4-trimethylquinoline, reaction product of diphenylamine and acetone, 1-(N-phenylamino)naphthalene, diphenylamine derivatives, dialkyl diphenylamines, N,N'-diphenyl-p-phenylenediamine, mixed diallyl-p-phenylenediamine, N-phenyl-N'-isopropyl-p-phenylenediamine, and N,N'-di-2-naphthyl-p-phenylenediamine compounds.

Examples of quinone anti-aging agents include hydroquinone compounds such as 2,5-di-t-butylhydroquinone, 2,5-di-t-octylhydroquinone, 2,6-di-n-dodeylhydroquinone, 2-n-dodecyl-5-chlorohydroquinone, and 2-t-octyl-5-methylhydroquinone.

Examples of sulfuric anti-aging agents include dilauryl-3,3'-thiodipropionate and distearyl-3,3'-thiodipropionate.

Examples of phenothiazine anti-aging agents include phenothiazine, 10-methylphenothiazine, 2-methylphenothiazine, and 2-trifluoromethylphenothiazine.

<Organic Solvent>

The presently disclosed binder composition for an all-solid-state secondary battery contains an organic solvent. The organic solvent may be an aromatic hydrocarbon such as toluene or xylene; an ether such as cyclopentyl methyl ether; or an ester such as butyl acetate or butyl butyrate, and is preferably butyl butyrate or xylene. One organic solvent may be used, or two or more organic solvents may be used in combination in a freely selected ratio.

In a case in which the (meth)acrylic polymer is obtained as an aqueous dispersion, solvent exchange of the solvent of the aqueous dispersion can be performed with the organic solvent. The method of solvent exchange is not specifically limited and may be a method in which the aqueous dispersion and the organic solvent are loaded into a rotary evaporator, the pressure is reduced, and then solvent exchange and dehydration operations are performed at a specific temperature.

<Other Components>

The presently disclosed binder composition for an all-solid-state secondary battery can contain components such as leveling agents, reinforcing materials, defoamers, anti-aging agents, surfactants, and dispersants other than the components described above. Commonly known components can be used as these components. A binder other than the (meth)acrylic polymer may be contained so long as the disclosed effects are not lost. Examples of such other binders include a polymer that includes a monomer unit selected from a vinylidene fluoride (VDF) monomer unit and a hexafluoropropylene (HFP) monomer unit (for example, polyvinylidene fluoride (PVDF), poly(hexafluoropropylene) (PHFP), etc.), a styrene-butadiene copolymer (SBR), an acrylonitrile-butadiene copolymer (NBR), hydrogenated NBR, and a polymer having a gel content of more than 50%.

<Make-Up and Viscosity of Binder Composition>

In the presently disclosed binder composition for an all-solid-state secondary battery, it is important that not less than 0.005 parts by mass and not more than 0.5 parts by mass of the anti-aging agent is used per 100 parts by mass of the polymer. The content of the anti-aging agent is preferably 0.0085 parts by mass or more, and more preferably 0.01 parts by mass or more from a viewpoint of improving pressability and improving cycle characteristics, and is preferably 0.3 parts by mass or less, and more preferably 0.2 parts by mass or less from a viewpoint of output characteristics.

Note that identification of an anti-aging agent in a binder composition can be performed by high-performance liquid chromatography-mass spectrometry, for example, and fast atom bombardment (FAB) can be used in this identification. Moreover, quantification of an anti-aging agent in a binder composition can be performed by a calibration curve method using high-performance liquid chromatography, for example.

The solid content concentration of the binder composition is preferably 5 mass % or more, and more preferably 6 mass % or more, and is preferably 20 mass % or less, and more preferably 15 mass % or less.

The viscosity (Brookfield B-type viscometer, 60 rpm, 25° C.) of the binder composition can be set as 2,000 mPa·s or less, and is preferably 1,800 mPa·s or less. The viscosity is preferably 50 mPa·s or more, and more preferably 500 mPa·s or more from a viewpoint of stability over time.

<Production Method of Binder Composition>

The production method of the presently disclosed binder composition for an all-solid-state secondary battery is not specifically limited and may be a method in which the (meth)acrylic polymer, anti-aging agent, and optional other components described above are mixed in the organic solvent.

In a case in which the (meth)acrylic polymer is obtained as an aqueous dispersion, the binder composition can be obtained by performing solvent exchange of the solvent of the aqueous dispersion with the organic solvent, and mixing the anti-aging agent and other components before or after this solvent exchange. The method of solvent exchange is not specifically limited and may be a method in which the aqueous dispersion and the organic solvent are loaded into a rotary evaporator, the pressure is reduced, and solvent exchange and dehydration operations are performed at a specific temperature. The timing of mixing of the anti-aging agent is not specifically limited and may be before or after exchange with the organic solvent. The organic solvent may be further added after solvent exchange in order to adjust the concentration of the binder composition.

(Slurry Composition for All-Solid-State Secondary Battery Solid Electrolyte Layer)

The presently disclosed slurry composition for an all-solid-state secondary battery solid electrolyte layer (hereinafter, also referred to as a "slurry composition for a solid electrolyte layer") contains the binder composition for an all-solid-state secondary battery set forth above and a solid electrolyte.

<Solid Electrolyte>

The solid electrolyte may be an inorganic solid electrolyte or a polymeric inorganic solid electrolyte without any specific limitations so long as it displays conductivity with respect to charge carriers such as lithium ions. One solid electrolyte may be used, or two or more solid electrolytes may be used in combination in a freely selected ratio. Moreover, a mixture of an inorganic solid electrolyte and a polymeric inorganic solid electrolyte may be used.

<<Inorganic Solid Electrolyte>>

The inorganic solid electrolyte may be a crystalline inorganic ion conductor or an amorphous inorganic ion conductor without any specific limitations. In a case in which the all-solid-state secondary battery is an all-solid-state lithium ion secondary battery, for example, the inorganic solid electrolyte is preferably a crystalline inorganic lithium ion conductor or an amorphous inorganic lithium ion conductor.

Although the following describes, as one example, a case in which the all-solid-state secondary battery is an all-solid-state lithium ion secondary battery, the present disclosure is not limited to this case.

Examples of crystalline inorganic lithium ion conductors include $Li_3N$, LISICON ($Li_{14}Zn(GeO_4)_4$), perovskite-type $Li_{0.5}La_{0.5}TiO_3$, garnet-type $Li_7La_3Zr_2O_{10}$, LIPON ($Li_{3+y}PO_{4-x}N_x$), and Thio-LISICON ($Li_{3.75}Ge_{0.25}P_{0.75}S_4$). Examples of amorphous inorganic lithium ion conductors include glass Li—Si—S—O and Li—P—S.

Of these examples, amorphous inorganic lithium ion conductors are preferable from a viewpoint of electrical conductivity of the inorganic solid electrolyte, and an amorphous sulfide containing Li and P is more preferable from a viewpoint of having high lithium ion conductivity and enabling reduction of internal resistance.

The amorphous sulfide containing Li and P is more preferably sulfide glass formed of $Li_2S$ and $P_2S_5$, and particularly preferably sulfide glass produced from a mixed raw material of $Li_2S$ and $P_2S_5$ in which the molar ratio of $Li_2S:P_2S_5$ is 65:35 to 85:15 from a viewpoint of reducing internal resistance and improving output characteristics of a battery. Sulfide glass-ceramic obtained by reacting such a mixed raw material by a mechanochemical method can also suitably be used. The molar ratio of $Li_2S:P_2S_5$ in the mixed raw material is preferably 68:32 to 80:20 from a viewpoint of maintaining a state of high lithium ion conductivity.

The lithium ion conductivity of the inorganic solid electrolyte is not specifically limited but is preferably $1 \times 10^{-4}$ S/cm or more, and more preferably $1 \times 10^{-3}$ S/cm or more.

Note that the amorphous sulfide inorganic solid electrolyte containing Li and P may contain one or more sulfides selected from the group consisting of $Al_2S_3$, $B_2S_3$, and $SiS_2$ as a starting material other than $Li_2S$ and $P_2S_5$ to the extent that ion conductivity is not reduced. The inclusion of such a sulfide can stabilize a glass component in the inorganic solid electrolyte.

In the same manner, the inorganic solid electrolyte may contain one or more ortho-oxoacid lithium salts selected from the group consisting of $Li_3PO_4$, $Li_4SiO_4$, $Li_4GeO_4$, $Li_3BO_3$, and $Li_3AlO_3$, in addition to $Li_2S$ and $P_2S_5$. The inclusion of such an ortho-oxoacid lithium salt can stabilize a glass component in the inorganic solid electrolyte.

The number-average particle diameter of the inorganic solid electrolyte is preferably 0.1 μm or more, and more preferably 0.3 μm or more, and is preferably 20 μm or less, more preferably 10 μm or less, even more preferably 7 μm or less, and particularly preferably 5 μm or less. When the number-average particle diameter is not less than any of the lower limits set forth above, handling is facilitated, and adhesiveness of a layer formed using the slurry composition can be sufficiently increased. On the other hand, when the number-average particle diameter is not more than any of the upper limits set forth above, sufficient surface area of the inorganic solid electrolyte can be ensured, and output characteristics of an all-solid-state secondary battery can be sufficiently improved.

The "number-average particle diameter" of an inorganic solid electrolyte referred to in the present specification can be determined by observing 100 particles of the inorganic solid electrolyte using an electron microscope, measuring the particle diameters of these particles in accordance with JIS Z8827-1:2008, and calculating an average value of the measured particle diameters.

<<Polymeric Inorganic Solid Electrolyte>>

The polymeric inorganic solid electrolyte may be a polymeric inorganic solid electrolyte obtained through inclusion of an electrolyte salt in a polyethylene oxide derivative, a polymer including a polyethylene oxide derivative, a polypropylene oxide derivative, a polymer including a polypropylene oxide derivative, a phosphoric acid ester polymer, a polycarbonate derivative, a polymer including a polycarbonate derivative, or the like.

In a case in which the all-solid-state secondary battery is an all-solid-state lithium ion secondary battery, examples of electrolyte salts that can be used include, but are not specifically limited to, fluorine-containing lithium salts such as lithium hexafluorophosphate ($LiPF_6$), lithium tetrafluoroborate ($LiBF_4$), and lithium bis(trifluoromethanesulfonyl) imide (LiTFSI).

<Other Components>

The slurry composition for a solid electrolyte layer can contain components such as leveling agents, reinforcing materials, defoamers, and anti-aging agents other than the components described above. Commonly known components can be used as these components.

The slurry composition for a solid electrolyte layer can contain organic solvent that is optionally further added in production of the slurry composition, and any of the organic solvents given as examples in relation to the binder composition can be used as this additional solvent. Specifically, butyl butyrate and xylene are examples of preferable solvents.

<Make-Up and Viscosity of Slurry Composition for Solid Electrolyte Layer>

The amount of the binder composition that is contained in the slurry composition for a solid electrolyte layer is preferably an amount such that the (meth)acrylic polymer in the binder composition is 0.1 parts by mass or more, and more preferably 0.5 parts by mass or more per 100 parts by mass of the solid electrolyte, and is preferably an amount such that the (meth)acrylic polymer in the binder composition is 7 parts by mass or less, and more preferably 5 parts by mass or less per 100 parts by mass of the solid electrolyte.

The viscosity of the slurry composition for a solid electrolyte layer (Brookfield B-type viscometer, 60 rpm, 25° C.) is preferably 500 mPa·s or more, and more preferably 1,000 mPa·s or more, and is preferably 10,000 mPa·s or less, and more preferably 6,000 mPa·s or less.

<Production Method of Slurry Composition for Solid Electrolyte Layer>

The production method of the slurry composition for a solid electrolyte layer is not specifically limited and may be a method in which the binder composition, solid electrolyte, optional additional organic solvent, and optional other components described above are mixed.

(Slurry Composition for All-Solid-State Secondary Battery Electrode)

The presently disclosed slurry composition for an all-solid-state secondary battery electrode (hereinafter, also referred to as a "slurry composition for an electrode") contains the binder composition for an all-solid-state secondary battery set forth above, a solid electrolyte, and an electrode active material.

<Solid Electrolyte>

The description in relation to the slurry composition for a solid electrolyte layer also applies to the solid electrolyte mentioned here, and any of the solid electrolytes given as examples or preferable examples in that description can be used as the solid electrolyte.

<Electrode Active Material>

The electrode active material is a material that gives and receives electrons in an electrode of an all-solid-state secondary battery. In a case in which the all-solid-state secondary battery is an all-solid-state lithium ion secondary battery, the electrode active material is normally a material that can occlude and release lithium.

Although the following describes a case in which the all-solid-state secondary battery is an all-solid-state lithium ion secondary battery, the present disclosure is not limited to this case.

A positive electrode active material formed of an inorganic compound or a positive electrode active material formed of an organic compound may be used as a positive electrode active material without any specific limitations. One positive electrode active material may be used, or two or more positive electrode active materials may be used in combination in a freely selected ratio. Moreover, a mixture of an inorganic compound and an organic compound may be used.

The positive electrode active material formed of an inorganic compound may be a transition metal oxide, a complex oxide of lithium and a transition metal (lithium-containing complex metal oxide), a transition metal sulfide, or the like. The aforementioned transition metal may be Fe, Co, Ni, Mn, or the like. Examples of inorganic compounds that can be used as the positive electrode active material include lithium-containing complex metal oxides such as a lithium-containing complex metal oxide of Co—Ni—Mn (Li(Co Mn Ni)$O_2$), a lithium-containing complex metal oxide of Ni—Co—Al, lithium-containing cobalt oxide (LiCoO$_2$), lithium-containing nickel oxide (LiNiO$_2$), lithium manganate (LiMnO$_2$, LiMn$_2$O$_4$), olivine-type lithium iron phosphate (LiFePO$_4$), and LiFeVO$_4$; transition metal sulfides such as TiS$_2$, TiS$_3$, and amorphous MoS$_2$; and transition metal oxides such as Cu$_2$V$_2$O$_3$, amorphous V$_2$O—P$_2$O$_5$, MoO$_3$, V$_2$O$_5$, and V$_6$O$_{13}$. These compounds may have undergone partial element substitution.

The positive electrode active material formed of an organic compound may be polyaniline, polypyrrole, a polyacene, a disulfide compound, a polysulfide compound, an N-fluoropyridinium salt, or the like.

An allotrope of carbon such as graphite or coke may be used as a negative electrode active material. A negative electrode active material formed of an allotrope of carbon can be in a mixed or coated form with a metal, metal salt, oxide, or the like. Examples of negative electrode active materials that can be used also include oxides and sulfates of silicon, tin, zinc, manganese, iron, nickel, and the like; lithium metal; lithium alloys such as Li—Al, Li—Bi—Cd, and Li—Sn—Cd; lithium transition metal nitrides; and silicone.

The number-average particle diameter of the electrode active material is preferably 0.1 μm or more, and more preferably 1 μm or more, and is preferably 40 μm or less, and more preferably 30 μm or less. When the number-average particle diameter is not less than any of the lower limits set forth above, handling is facilitated, and adhesiveness of an obtained electrode mixed material layer can be sufficiently increased. On the other hand, when the number-average particle diameter is not more than any of the upper limits set forth above, sufficient surface area of the electrode active material can be ensured, and output characteristics of an all-solid-state secondary battery can be sufficiently improved.

The "number-average particle diameter" of an electrode active material referred to in the present specification can be determined by observing 100 particles of the electrode active material using an electron microscope, measuring the particle diameters of these particles in accordance with JIS Z8827-1:2008, and calculating an average value of the measured particle diameters.

<Conductive Material>

The slurry composition for an electrode can contain a conductive material. The inclusion of a conductive material makes it easier to ensure electrical contact among the electrode active material in an electrode mixed material layer. Examples of conductive materials that can be used include conductive carbon materials such as carbon black (for example, acetylene black, Ketjenblack® (Ketjenblack is a registered trademark in Japan, other countries, or both), and furnace black), single-walled or multi-walled carbon nanotubes (multi-walled carbon nanotubes are inclusive of cup-stacked carbon nanotubes), carbon nanohorns, vapor-grown carbon fiber, milled carbon fiber obtained by pyrolyzing and then pulverizing polymer fiber, single layer or multilayer graphene, and carbon nonwoven fabric sheet obtained through pyrolysis of nonwoven fabric made from polymer fiber; and fibers and foils of various metals. Of these conductive materials, acetylene black, Ketjenblack, and furnace black are preferable. One conductive material may be used, or two or more conductive materials may be used in combination in a freely selected ratio.

<Other Components>

The slurry composition for an electrode can contain components such as leveling agents, reinforcing materials, defoamers, surfactants, and dispersants other than the components described above. Commonly known components can be used as these components.

The slurry composition for an electrode can contain organic solvent that is optionally further added in production of the slurry composition, and any of the organic solvents given as examples in relation to the binder composition can be used as this additional solvent. Specifically, butyl butyrate and xylene are examples of preferable solvents.

<Make-Up and Viscosity of Slurry Composition for Electrode>

The amount of the solid electrolyte contained in the slurry composition for an electrode is preferably an amount such that the proportion constituted by the solid electrolyte in the total amount (100 mass %) of the electrode active material and the solid electrolyte is 10 mass % or more, and more preferably 20 mass % or more, and is preferably an amount such that the proportion constituted by the solid electrolyte in the total amount (100 mass %) of the electrode active material and the solid electrolyte is 70 mass % or less, and more preferably 60 mass % or less. When this proportion is not less than any of the lower limits set forth above, sufficient ion conductivity can be ensured, the electrode active material can be effectively utilized, and the capacity of an all-solid-state secondary battery can be sufficiently increased. Moreover, when this proportion is not more than any of the upper limits set forth above, a sufficient amount of the electrode active material can be ensured, and the capacity of an all-solid-state secondary battery can be sufficiently increased.

The amount of the binder composition that is contained in the slurry composition for an electrode is preferably an amount such that the (meth)acrylic polymer in the binder composition is 0.1 parts by mass or more, and more preferably 0.5 parts by mass or more per 100 parts by mass, in total, of the electrode active material and the solid electrolyte, and is preferably an amount such that the (meth)acrylic polymer in the binder composition is 7 parts by mass or less, and more preferably 5 parts by mass or less per 100 parts by mass, in total, of the electrode active material and the solid electrolyte.

The viscosity of the slurry composition for an electrode (Brookfield B-type viscometer, 60 rpm, 25° C.) is preferably 500 mPa·s or more, and more preferably 1,000 mPa·s or more, and is preferably 10,000 mPa·s or less, and more preferably 6,000 mPa·s or less.

<Production Method of Slurry Composition for Electrode>

The production method of the slurry composition is not specifically limited and may be a method in which the binder composition, solid electrolyte, electrode active material, optional conductive material, optional additional organic solvent, and optional other components described above are mixed. In a case in which a conductive material is used, the binder composition and the conductive material may be mixed in advance, and then the solid electrolyte, the electrode active material, and so forth may be added thereto.

(Solid Electrolyte Layer for All-Solid-State Secondary Battery)

The presently disclosed solid electrolyte layer for an all-solid-state secondary battery (hereinafter, also referred to as a "solid electrolyte layer") is a layer that is formed using the presently disclosed slurry composition for an all-solid-state secondary battery solid electrolyte layer and is obtained by, for example, applying the slurry composition for a solid electrolyte layer onto the surface of a suitable substrate to form a coating film, and subsequently drying the coating film that is formed.

The presently disclosed solid electrolyte layer contains at least a solid electrolyte, a (meth)acrylic polymer, and an anti-aging agent, and the proportional contents of these components are normally equal to the proportional contents thereof in the slurry composition for a solid electrolyte layer.

Examples of methods by which the solid electrolyte layer may be formed include the following methods.

(1) A method in which the presently disclosed slurry composition for a solid electrolyte layer is applied onto an electrode (normally the surface of an electrode mixed material layer; same applies below) and is then dried to form a solid electrolyte layer on the electrode (2) A method in which the presently disclosed slurry composition for a solid electrolyte layer is applied onto a substrate, is dried, and then the obtained solid electrolyte layer is transferred onto an electrode so as to form a solid electrolyte layer on the electrode (3) A method in which the presently disclosed slurry composition for a solid electrolyte layer is applied onto a substrate and is dried to obtain a dried product of the slurry composition for a solid electrolyte layer that is then pulverized to obtain a powder, and this powder is then molded into the form of a layer to form a free-standing solid electrolyte layer Commonly known methods can be adopted as the methods of application, drying, transferring, pulverizing, molding, and so forth in methods (1) to (3) without any specific limitations.

For example, the application method may be doctor blading, dip coating, reverse roll coating, direct roll coating, gravure coating, extrusion coating, brush coating, or the like.

The drying method may be drying through warm, hot, or low-humidity air, vacuum drying, or drying through irradiation with (far) infrared light, electron beams, or the like, for example. The drying conditions can be set as appropriate, and the drying temperature is preferably not lower than 50° C. and not higher than 250° C., and preferably not lower than 80° C. and not higher than 200° C. The drying time is not specifically limited but is normally within a range of not less than 10 minutes and not more than 60 minutes.

Note that the solid electrolyte layer may be stabilized by performing pressing of the solid electrolyte layer after drying. The pressing method is not specifically limited and may be a method such as mold pressing or calender pressing.

The applied amount of the slurry composition for a solid electrolyte layer can be set as appropriate depending on the desired solid electrolyte layer thickness, etc., without any specific limitations.

The thickness of the solid electrolyte layer is not specifically limited but is preferably 10 μm or more, more preferably 20 μm or more, and even more preferably 30 μm or more, and is preferably 1,000 μm or less, more preferably 800 μm or less, and even more preferably 600 μm or less. A thickness of not less than any of the lower limits set forth above can sufficiently prevent short-circuiting of a positive electrode and a negative electrode, whereas a thickness of not more than any of the upper limits set forth above is advantageous in terms of reducing internal resistance.

(Electrode for All-Solid-State Secondary Battery)

The presently disclosed electrode for an all-solid-state secondary battery (hereinafter, also referred to as an "electrode") is an electrode that is formed using the presently disclosed slurry composition for an all-solid-state secondary battery electrode. For example, the slurry composition for an electrode may be applied onto the surface of a current collector to form a coating film, and the coating film that is formed may subsequently be dried to thereby obtain an electrode that includes the current collector and an electrode mixed material layer on the current collector.

The presently disclosed electrode contains at least a solid electrolyte, an electrode active material, a (meth)acrylic polymer, and an anti-aging agent, and the proportional contents of these components are normally equal to the proportional contents thereof in the slurry composition for an electrode.

The current collector is not specifically limited so long as it is a material having electrical conductivity and electrochemical durability. A metal material such as iron, copper, aluminum, nickel, stainless steel, titanium, tantalum, gold, or platinum is preferable from a viewpoint of heat resistance, of which, aluminum is particularly preferable for a positive electrode, and copper is particularly preferable for a negative electrode. Although no specific limitations are placed on the shape of the current collector, a sheet shape of approximately 0.001 mm to 0.5 mm in thickness is preferable. The current collector is preferably subjected to surface roughening before use in order to increase adhesive strength with the electrode mixed material layer. The surface roughening method is not specifically limited and may be a mechanical polishing method, an electrolytic polishing method, a chemical polishing method, or the like. In the mechanical polishing method, a coated abrasive to which abrasive grains are bonded, a whetstone, an emery wheel, or a wire brush including steel wire or the like may be used. Moreover, an intermediate layer may be formed at the surface of the current collector in order to increase adhesive strength of the current collector and the electrode mixed material layer and/or electrical conductivity.

Any of the methods given as examples in relation to application of the slurry composition for a solid electrolyte layer can be adopted as the method by which the slurry composition for an electrode is applied without any specific limitations.

Moreover, any of the methods given as examples in relation to drying of the slurry composition for a solid electrolyte layer can be adopted as the method by which the slurry composition for an electrode is dried without any specific limitations.

The electrode may be stabilized by performing pressing of the electrode after drying. The pressing method is not specifically limited and may be a method such as mold pressing or calender pressing.

The applied amount of the slurry composition for an electrode can be set as appropriate depending on the desired electrode mixed material layer thickness, etc., without any specific limitations.

The mass per unit area of the electrode mixed material layer is not specifically limited but is preferably 1.0 mg/cm$^2$ or more, and more preferably 5.0 mg/cm$^2$ or more, and is preferably 30.0 mg/cm$^2$ or less, and more preferably 25.0 mg/cm$^2$ or less.

(All-Solid-State Secondary Battery)

The presently disclosed all-solid-state secondary battery includes either or both of the presently disclosed solid electrolyte layer and the presently disclosed electrode (positive electrode or negative electrode). In other words, at least one of a solid electrolyte layer, a positive electrode, and a negative electrode in the presently disclosed all-solid-state secondary battery is formed using a slurry composition (slurry composition for a solid electrolyte layer in the case of a solid electrolyte layer and slurry composition for an electrode in the case of a positive electrode or negative electrode) that contains the presently disclosed binder composition.

Examples of electrodes not corresponding to the presently disclosed electrode that can be used in the presently disclosed all-solid-state secondary battery include any electrode for an all-solid-state secondary battery without any specific limitations.

Moreover, examples of solid electrolyte layers not corresponding to the presently disclosed solid electrolyte layer that can be used in the presently disclosed all-solid-state secondary battery include any solid electrolyte layer without any specific limitations.

The presently disclosed all-solid-state secondary battery can be obtained by stacking the positive electrode and the negative electrode such that a positive electrode mixed material layer of the positive electrode and a negative electrode mixed material layer of the negative electrode are in opposition via the solid electrolyte layer, optionally performing pressing thereof to obtain a laminate, subsequently placing the laminate in a battery container in that form or after rolling, folding, or the like in accordance with the battery shape, and then sealing the battery container. An expanded metal, an overcurrent preventing device such as a fuse or a PTC device, a lead plate, or the like may be placed in the battery container as necessary in order to prevent pressure increase inside the battery and occurrence of overcharging or overdischarging. The battery shape may be a coin type, button type, sheet type, cylinder type, prismatic type, flat type, or the like without any specific limitations.

In production of the all-solid-state secondary battery, press processing is normally performed in a production step of the all-solid-state secondary battery such as at a stage when a solid electrolyte layer or an electrode mixed material layer is formed, a stage when layers are stacked, or a stage when a battery cell is assembled. This press processing is normally performed with a pressure of not less than 50 MPa and not more than 1,500 MPa, but since excellent pressability is imparted to a formed layer (solid electrolyte layer and/or electrode mixed material layer) through use of the presently disclosed binder composition, excellent output characteristics and high-temperature cycle characteristics can be achieved in the all-solid-state secondary battery.

EXAMPLES

The following provides a more specific description of the present disclosure based on examples. However, the present disclosure is not limited to the following examples. In the following description, "%" and "parts" used in expressing quantities are by mass, unless otherwise specified. In the examples and comparative examples, measurements of the weight-average molecular weight, proportional contents of monomer units, and gel content of a polymer were performed as described below. Evaluations of leveling performance of a slurry composition, close adherence (peel strength), and battery characteristics (output characteristics and high-temperature cycle characteristics) of an all-solid-state secondary battery were also performed as described below.

<Weight-Average Molecular Weight of Polymer>

The weight-average molecular weight of a polymer produced in each example or comparative example was calculated based on polystyrene-equivalent molecular weight obtained using high-performance liquid chromatography (apparatus: HLC8220 (model no.) produced by Tosoh Corporation). In this high-performance liquid chromatography, three connected columns (Shodex KF-404HQ (model no.) produced by Showa Denko K.K.; column temperature: 40° C.; carrier: tetrahydrofuran at flow rate of 0.35 mL/min) were used and a differential refractometer and a UV detector were used as detectors. Calibration of molecular weight was performed using 12 points for standard polystyrene (produced by Polymer Laboratories; standard molecular weight: 500 to 3,000,000).

<Proportional Contents of Monomer Units in Polymer>

After coagulating 100 g of a binder composition produced in Example 8 (described further below) in 1 L of methanol, 12 hours of vacuum drying was performed at a temperature of 60° C. The obtained dry polymer was analyzed by $^1$H-NMR. Based on the obtained analysis values, the proportional content (mass %) of each type of monomer unit and structural unit included in a polymer in the binder composition was calculated. In other examples and comparative examples, the proportional content of each type of monomer unit was substantially the same as the proportional content (charged amount) of the monomer in a monomer composition.

<Gel Content (Amount of THF-Insoluble Content)>

With respect to a reaction liquid after polymerization of monomers and before mixing of an anti-aging agent in production of a binder composition in each example or comparative example (water dispersion after a hydrogenation reaction and concentrating, but prior to mixing of an anti-aging agent in Example 8), the reaction liquid was dried in an environment of 50% humidity and 23° C. to 25° C. to produce a film of 3 ±0.3 mm in thickness. The produced film was cut up into 5 mm squares to prepare a plurality of film pieces, and approximately 1 g of these film pieces were precisely weighed. The weight of the precisely weighed film pieces was taken to be $W_0$. Next, the precisely weighed film pieces were immersed in 100 g of tetrahydrofuran (THF) at 25° C. for 24 hours. The film pieces were subsequently pulled out of the THF, the pulled out film pieces were vacuum dried at 105° C. for 3 hours, and the weight $W_1$ of the film pieces (weight of insoluble content) was measured. The amount of THF-insoluble content was calculated according to the following formula as the gel content (mass %).

Gel content (mass %)=$W_1/W_0 \times 100$

<Leveling Performance>

A transparent glass tube having a flat-bottomed cylindrical shape with an internal diameter of 30 mm and a height of 120 mm was prepared, and two reference lines were marked at positions at heights of 55 mm and 85 mm from the bottom of the tube. (Hereinafter, the reference line at the position having a height of 55 mm is referred to as the "A line" and the reference line at the position having a height of 85 mm is referred to as the "B line".)

A slurry composition obtained in each example or comparative example was loaded up to the A line in the glass tube, a rubber stopper was fitted to the glass tube, and then the glass tube was left in an upright state in a 25° C. environment for 10 minutes.

Thereafter, the time t taken from when the glass tube was inclined into a horizontal state until a front of the liquid surface of the slurry composition passed the B line was measured, and leveling performance was evaluated by the following standard. A shorter time t indicates better leveling performance during application.

A: Time t of less than 1 s
B: Time t of not less than 1 s and less than 5 s
C: Time t of not less than 5 s and less than 10 s
D: Time t of 10 s or more <Close Adherence (Peel Strength)>

An electrode or copper foil including a solid electrolyte layer that was obtained in each example or comparative example was cut out as a rectangular shape of 2.5 cm in width and 10 cm in length to obtain a test specimen. Cellophane tape was affixed to the surface of the electrode mixed material layer or the solid electrolyte layer of the test specimen, and then the stress when the cellophane tape was peeled off from one end of the test specimen in a direction at 180° and at a speed of 50 mm/min was measured. Ten measurements were performed in this manner, an average value of the measurements was determined and was taken to be the peel strength (N/m), and close adherence was evaluated by the following standard. A larger average value for peel strength indicates better close adherence.

A: Peel strength average value of 20 N/m or more
B: Peel strength average value of not less than 15 N/m and less than 20 N/m
C: Peel strength average value of not less than 10 N/m and less than 15 N/m
D: Peel strength average value of less than 10 N/m <Battery Characteristics: Output Characteristics>

An all-solid-state secondary battery produced in each example or comparative example was charged to 4.3 V by a 0.1C constant-current method, was subsequently discharged to 3.0 V at 0.1C, and the 0.1C discharge capacity was determined. Thereafter, the all-solid-state secondary battery was charged to 4.3 V at 0.1C, was subsequently discharged to 3.0 V at 10C, and the 10C discharge capacity was determined.

The same measurements were performed for 10 cells. An average value for the 0.1C discharge capacity was taken to be the 0.1C discharge capacity a, an average value for the 10C discharge capacity was taken to be the 10C discharge capacity b, and a capacity ratio expressed by a ratio (b/a (%)) of the 10C discharge capacity b relative to the 0.1C discharge capacity a was determined and was evaluated by the following standard. A larger value indicates smaller internal resistance and better output characteristics.

A: Capacity ratio of 50% or more
B: Capacity ratio of not less than 40% and less than 50%
C: Capacity ratio of not less than 30% and less than 40%
D: Capacity ratio of less than 30%

<Battery Characteristics: High-Temperature Cycle Characteristics>

An all-solid-state secondary battery produced in each example or comparative example was subjected to 100 cycles of charging and discharging at 60° C. in which the all-solid-state secondary battery was charged from 3 V to 4.3 V at 0.1C and was then discharged from 4.3 V to 3 V at 0.1C. A capacity maintenance rate expressed by a ratio (d/c (%)) of the 0.1C discharge capacity d of the $100^{th}$ cycle relative to the 0.1C discharge capacity c of the $5^{th}$ cycle was determined and was evaluated by the following standard. A larger value indicates less reduction of discharge capacity and better high-temperature cycle characteristics.

A: Capacity maintenance rate of 60% or more
B: Capacity maintenance rate of not less than 50% and less than 60%
C: Capacity maintenance rate of not less than 40% and less than 50%
D: Capacity maintenance rate of not less than 30% and less than 40%

Example 1: All-Solid-State Secondary Battery Including Presently Disclosed Negative Electrode <Production of (Meth)Acrylic Polymer and Binder Composition>

A 1 L septum-equipped flask including a stirrer was charged with 100 parts of deionized water and 0.2 parts of sodium dodecylbenzenesulfonate as an emulsifier, the gas phase was purged with nitrogen gas, heating was performed to 60° C., and then 0.25 parts of potassium persulfate (KPS) as a polymerization initiator was dissolved in 20.0 parts of deionized water and was added into the flask.

Meanwhile, a monomer composition was obtained in a separate vessel by mixing 40 parts of deionized water, 1.0 parts of sodium dodecylbenzenesulfonate as an emulsifier, 15 parts of styrene (St), 80 parts of n-butyl acrylate (BA), and 5 parts of acrylonitrile (AN). This monomer composition was continuously added into the 1 L septum-equipped flask over 3 hours to carry out polymerization. The reaction was carried out at 60° C. during the addition. Once the addition was complete, a further 3 hours of stirring was performed at 80° C. to complete the reaction.

Next, 0.08 parts of 3-(3,5-di-t-butyl-4-hydroxyphenyl) propionic acid octadecyl ester (anti-aging agent 1) and 0.02 parts of 4,6-bis(octylthiomethyl)-o-cresol (anti-aging agent 2) per 100 parts by mass of solid content in the reaction liquid were added to the reaction liquid as phenolic anti-aging agents and were mixed therewith.

A suitable amount of xylene was added to the resultant water dispersion of a polymer to obtain a mixture. The mixture was subsequently subjected to vacuum distillation at 80° C. to remove water and excess xylene from the mixture, and thereby yield a binder composition (solid content concentration: 8%).

<Production of Slurry Composition for Negative Electrode>

A composition having a solid content concentration of 60% was produced by mixing 65 parts of graphite (number-average particle diameter: 20 μm) as a negative electrode active material, 30 parts of sulfide glass composed of $Li_2S$ and $P_2S_5$ ($Li_2S/P_2S_5$=70 mol %/30 mol %; number-average particle diameter: 0.9 μm) as a solid electrolyte, 3 parts of acetylene black as a conductive material, and the binder composition described above (amount equivalent to 2 parts of solid content), and then adding xylene to the resultant mixture. This composition was mixed by a planetary kneader to obtain a slurry composition for a negative electrode mixed material layer. The obtained slurry composition for a negative electrode was used to evaluate leveling performance.

<Production of Negative Electrode>

The slurry composition for a negative electrode was applied onto the surface of copper foil serving as a current collector and was dried at 120° C. for 30 minutes to obtain a negative electrode including a negative electrode mixed material layer (mass per unit area: 10.0 mg/cm$^2$) at one side of the copper foil serving as a current collector. The obtained negative electrode was used to evaluate close adherence.

<Production of Slurry Composition for Positive Electrode>

A composition having a solid content concentration of 75% was produced by mixing 65 parts of an active material NMC532 based on a lithium complex oxide of Co—Ni—Mn ($LiNi_{5/10}Co_{2/10}Mn_{3/10}O_2$; number-average particle diameter: 10.0 μm) as a positive electrode active material, 30 parts of sulfide glass composed of $Li_2S$ and $P_2S_5$ ($Li_2S/P_2S_5$=70 mol %/30 mol %; number-average particle diameter: 0.9 μm) as a solid electrolyte, 3 parts of acetylene black as a conductive material, and a binder composition (for a positive electrode mixed material layer) produced in the same way as in Example 1 with the exception that anti-aging agents were not compounded (amount equivalent to 2 parts of solid content), and then adding xylene to the resultant mixture. This composition was mixed by a planetary kneader for 60 minutes, and was then adjusted to a solid content concentration of 70% with xylene and mixed for a further 10 minutes by the planetary kneader to obtain a slurry composition for a positive electrode.

<Production of Positive Electrode>

The slurry composition for a positive electrode was applied onto the surface of aluminum foil serving as a current collector and was dried at 120° C. for 30 minutes to obtain a positive electrode including a positive electrode mixed material layer (mass per unit area: 18.0 mg/cm$^2$) at one side of the aluminum foil serving as a current collector.

<Production of Slurry Composition for Solid Electrolyte Layer>

A composition having a solid content concentration of 60% was produced by mixing 98 parts of sulfide glass composed of $Li_2S$ and $P_2S_5$ ($Li_2S/P_2S_5$=70 mol %/30 mol %; number-average particle diameter: 0.9 μm) as a solid electrolyte and a binder composition produced in the same way as in Example 1 with the exception that anti-aging agents were not compounded (amount equivalent to 2 parts of solid content), and then adding xylene to the resultant mixture. This composition was mixed by a planetary kneader to obtain a slurry composition for a solid electrolyte layer.

<Production of Solid Electrolyte Layer>

The slurry composition for a solid electrolyte layer was dried on a releasable sheet serving as a substrate, and then a dried product thereof was peeled from the releasable sheet and was ground in a mortar to obtain a powder. A pellet (solid electrolyte layer) of 500 μm in thickness was obtained by loading 0.05 mg of the obtained powder into a Ø10 mm mold and performing molding thereof at a pressure of 200 MPa.

<Production of All-Solid-State Secondary Battery>

The negative electrode and the positive electrode obtained as described above were each punched out as Ø10 mm. The solid electrolyte layer obtained as described above was sandwiched between the punched out positive electrode and negative electrode (with the electrode mixed material layers of these electrodes in contact with the solid electrolyte layer), and pressing thereof was performed with a pressure of 200 MPa to obtain a laminate for an all-solid-state secondary battery. The obtained laminate was arranged inside an evaluation cell (restraining pressure: 40 MPa) to obtain an all-solid-state secondary battery. Cell characteristics of the obtained all-solid-state secondary battery were evaluated.

In Examples 1 to 7 and 9 to 12 and in Comparative Examples 1 to 3, a binder composition, a slurry composition for a negative electrode mixed material layer, a slurry composition for a positive electrode mixed material layer, a slurry composition for a solid electrolyte layer, a negative electrode, a positive electrode, and an all-solid-state secondary battery were produced in the same way as in Example 1 with the exception that the types and amounts of monomers in the monomer composition and the types and amounts of anti-aging agents were set as the types and amounts indicated in Table 1. Note that the binder composition used in the slurry composition for a positive electrode mixed material layer and the slurry composition for a solid electrolyte layer was produced in the same way as the binder composition for the slurry composition for a negative electrode mixed material layer in each example or comparative example with the exception that anti-aging agents were not compounded. Evaluation of cell characteristics of a battery was performed in the same way as in Example 1 with respect to each of the produced all-solid-state secondary batteries. The results are shown in Table 1.

Anti-aging agents in the table are as follows.
Phenolic Anti-Aging Agents
  Anti-aging agent 1: 3-(3,5-Di-t-butyl-4-hydroxyphenyl) propionic acid octadecyl ester
  Anti-aging agent 2: 4,6-Bis(octylthiomethyl)-o-cresol
  Anti-aging agent 3: 4-[[4,6-Bis(octylthio)-1,3,5-triazin-2-yl]amino]-2,6-di-t-butylphenol
  Anti-aging agent 4: 2,6-Di-t-butyl-4-methylphenol
Phosphite Anti-Aging Agent
  Anti-aging agent 5: 3,9-Bis(octadecyloxy)-2,4,8,10-tetraoxa-3,9-diphosphaspiro[5.5]undecane Example 8

A slurry composition for a negative electrode, a slurry composition for a positive electrode, a slurry composition for a solid electrolyte layer, a solid electrolyte layer, a negative electrode, a positive electrode, and an all-solid-state secondary battery were produced, and cell characteristics of the battery were evaluated in the same way as in Example 1 with the exception that a (meth)acrylic polymer was produced and a binder composition was obtained as described below. The results are shown in Table 1. The measurement method of the proportional contents of monomer units in the (meth)acrylic polymer was as previously described.

A reactor was charged with 2 parts of potassium oleate as an emulsifier, 0.1 parts of potassium phosphate as a stabilizer, and 150 parts of water. In addition, 19 parts of acrylonitrile (AN), 48 parts of 1,3-butadiene (BD), 33 parts of butyl acrylate (BA), and 0.31 parts of t-dodecyl mercaptan as a molecular weight modifier were added into the reactor, and emulsion polymerization was initiated at 10° C. in the presence of 0.015 parts of ferrous sulfate as an activator and 0.05 parts of paramenthane hydroperoxide as a polymerization initiator. At the point at which the polymerization conversion rate reached 85%, 0.2 parts of hydroxylamine sulfate was added per 100 parts of monomers to end the polymerization.

Once the polymerization had ended, heating was performed and then water vapor distillation was performed at 80° C. under reduced pressure in order to collect unreacted monomer and obtain a water dispersion of a polymer.

After loading 400 mL of the obtained water dispersion of the polymer (total solid content: 48 g) into a 1 L autoclave that was equipped with a stirrer, nitrogen gas was passed for 10 minutes in order to remove dissolved oxygen in the water dispersion. Thereafter, 50 mg of palladium acetate was dissolved in 180 mL of water to which nitric acid had been added in an amount of 4 molar equivalents relative to the Pd and was then added into the autoclave as a hydrogenation reaction catalyst. After purging the system twice with hydrogen gas, the contents of the autoclave were heated to 50° C. in a state in which the pressure was raised to 3 MPa with hydrogen gas, and a hydrogenation reaction was carried out for 6 hours.

Next, the contents of the autoclave were restored to normal temperature and the system was converted to a nitrogen atmosphere. Thereafter, concentrating was performed using an evaporator until a solid content concentration of 40% was reached to thereby yield a water dispersion of a (meth)acrylic polymer.

Next, 0.08 parts of 3-(3,5-di-t-butyl-4-hydroxyphenyl) propionic acid octadecyl ester (anti-aging agent 1) and 0.02 parts of 4,6-bis(octylthiomethyl)-o-cresol (anti-aging agent 2) per 100 parts by mass of solid content in the water dispersion of the (meth)acrylic polymer were added to the water dispersion as phenolic anti-aging agents and were mixed therewith.

A suitable amount of xylene was then added to the water dispersion to which the anti-aging agents had been added to obtain a mixture. The mixture was subsequently subjected to vacuum distillation at 90° C. to remove water and excess xylene from the mixture and thereby yield a binder composition (solid content concentration: 8%).

Example 13

A slurry composition for a positive electrode containing the presently disclosed binder composition was produced, and then a positive electrode including a positive electrode mixed material layer formed using this slurry composition was produced.

<Production of Slurry Composition for Positive Electrode>

A composition having a solid content concentration of 75% was produced by mixing 65 parts of an active material NMC532 based on a lithium complex oxide of Co—Ni—

Mn (LiNi$_{5/10}$Co$_{2/10}$Mn$_{3/10}$O$_2$; number-average particle diameter: 10.0 μm) as a positive electrode active material, 30 parts of sulfide glass composed of Li$_2$S and P$_2$S$_5$ (Li$_2$S/P$_2$S$_5$=70 mol %/30 mol %; number-average particle diameter: 0.9 μm) as a solid electrolyte, 3 parts of acetylene black as a conductive material, and the binder composition produced in Example 1 (amount equivalent to 2 parts of solid content), and then adding xylene to the resultant mixture. This composition was mixed by a planetary kneader for 60 minutes, and was then adjusted to a solid content concentration of 70% with xylene and mixed for a further 10 minutes by the planetary kneader to obtain a slurry composition for a positive electrode. The obtained slurry composition for a positive electrode was used to evaluate leveling performance.

<Production of Positive Electrode>

The slurry composition for a positive electrode was applied onto the surface of aluminum foil serving as a current collector and was dried at 120° C. for 30 minutes to obtain a positive electrode including a positive electrode mixed material layer (mass per unit area: 18.0 mg/cm$^2$) at one side of the aluminum foil serving as a current collector. The obtained positive electrode was used to evaluate close adherence.

Example 14

A slurry composition for a solid electrolyte layer containing the presently disclosed binder composition was produced.

<Production of Slurry Composition for Solid Electrolyte Layer>

A composition having a solid content concentration of 60% was produced by mixing 98 parts of sulfide glass composed of Li$_2$S and P$_2$S$_5$ (Li$_2$S/P$_2$S$_5$=70 mol %/30 mol %; number-average particle diameter: 0.9 μm) as a solid electrolyte and the binder composition produced in Example 1 (amount equivalent to 2 parts of solid content), and then adding xylene to the resultant mixture. This composition was mixed by a planetary kneader to obtain a slurry composition for a solid electrolyte layer. The obtained slurry composition for a solid electrolyte layer was used to evaluate leveling performance.

<Production of Solid Electrolyte Layer>

The slurry composition for a solid electrolyte layer was applied onto copper foil and was dried at 120° C. for 30 minutes to obtain a solid electrolyte layer of 100 μm in thickness on the copper foil. The obtained solid electrolyte layer on the copper foil was used to evaluate close adherence.

TABLE 1

| | | Example 1 | Example 2 | Example 3 | Example 4 | Example 5 | Example 6 | Example 7 |
|---|---|---|---|---|---|---|---|---|
| Monomer composition *1 (parts by mass) | Butyl acrylate (BA) | 80 | 70 | 90 | 80 | 80 | 50 | 62 |
| | Ethyl acrylate (EA) | — | — | — | — | — | 30 | — |
| | Acrylonitrile (AN) | 5 | 15 | 5 | 5 | 5 | 5 | 28 |
| | Styrene (St) | 15 | 15 | 5 | 15 | 15 | 15 | 10 |
| | Hydrogenated butadiene | — | — | — | — | — | — | — |
| Polymer | Gel content | 0% | 2% | 0% | 0% | 0% | 0% | 4% |
| | Weight-average molecular weight | 650,000 | 800,000 | 700,000 | 650,000 | 650,000 | 750,000 | 600,000 |
| Additive amount of anti-aging agent *2 (parts by mass) | Anti-aging agent 1 | 0.08 | 0.08 | 0.08 | 0.018 | 0.2 | 0.08 | 0.08 |
| | Anti-aging agent 2 | 0.02 | 0.02 | 0.02 | 0.0072 | 0.05 | 0.02 | 0.02 |
| | Anti-aging agent 3 | — | — | — | — | — | — | — |
| | Anti-aging agent 4 | — | — | — | — | — | — | — |
| | Anti-aging agent 5 | — | — | — | — | — | — | — |
| Location of use of binder composition | | Negative electrode mixed material layer | Negative electrode mixed material layer | Negative electrode mixed material layer | Negative electrode mixed material layer | Negative electrode mixed material layer | Negative electrode mixed material layer | Negative electrode mixed material layer |
| Characteristics | Leveling performance | A | A | B | A | A | A | B |
| | Close adherence strength | A | A | A | B | A | A | A |
| | Output characteristics | A | A | B | A | B | A | B |
| | High-temperature cycle characteristics | A | A | A | B | A | A | B |

TABLE 1-continued

|  |  | Example 8 | Example 9 | Example 10 | Example 11 | Example 12 | Comparative Example 1 |
|---|---|---|---|---|---|---|---|
| Monomer composition *1 (parts by mass) | Butyl acrylate (BA) | 30 | 80 | 80 | 95 | 70 | 80 |
|  | Ethyl acrylate (EA) | — | — | — | — | — | — |
|  | Acrylonitrile (AN) | 20 | 5 | 5 | 5 | 30 | 5 |
|  | Styrene (St) | — | 15 | 15 | — | — | 15 |
|  | Hydrogenated butadiene | 50 | — | — | — | — | — |
| Polymer | Gel content | 3% | 0% | 0% | 0% | 4% | 0% |
|  | Weight-average molecular weight | 350,000 | 650,000 | 650,000 | 750,000 | 600.000 | 650,000 |
| Additive amount of anti-aging agent *2 (parts by mass) | Anti-aging agent 1 | 0.08 | — | — | 0.08 | 0.08 | — |
|  | Anti-aging agent 2 | 0.02 | — | — | 0.02 | 0.02 | — |
|  | Anti-aging agent 3 | — | 0.03 | — | — | — | — |
|  | Anti-aging agent 4 | — | 0.07 | — | — | — | — |
|  | Anti-aging agent 5 | — | — | 0.1 | — | — | — |
| Location of use of binder composition |  | Negative electrode mixed material layer | Negative electrode mixed material layer | Negative electrode mixed material layer | Negative electrode mixed material layer | Negative electrode mixed material layer | Negative electrode mixed material layer |
| Characteristics | Leveling performance | B | A | A | B | B | A |
|  | Close adherence strength | A | A | B | B | B | D |
|  | Output characteristics | B | A | B | B | B | D |
|  | High-temperature cycle characteristics | B | A | B | B | B | D |

|  |  | Comparative Example 2 | Comparative Example 3 | Example 13 | Example 14 |
|---|---|---|---|---|---|
| Monomer composition *1 (parts by mass) | Butyl acrylate (BA) | 98 | 10 | 80 | 80 |
|  | Ethyl acrylate (EA) | — | — | — | — |
|  | Acrylonitrile (AN) | 2 | 20 | 5 | 5 |
|  | Styrene (St) | 0 | 70 | 15 | 15 |
|  | Hydrogenated butadiene | — | — | — | — |
| Polymer | Gel content | 0% | 0% | 0% | 0% |
|  | Weight-average molecular weight | 550,000 | 850,000 | 650.000 | 650,000 |
| Additive amount of anti-aging agent *2 (parts by mass) | Anti-aging agent 1 | 0.08 | 0.08 | 0.08 | 0.08 |
|  | Anti-aging agent 2 | 0.02 | 0.02 | 0.02 | 0.02 |
|  | Anti-aging agent 3 | — | — | — | — |
|  | Anti-aging agent 4 | — | — | — | — |
|  | Anti-aging agent 5 | — | — | — | — |
| Location of use of binder composition |  | Negative electrode mixed material layer | Negative electrode mixed material layer | Positive electrode mixed material layer | Solid electrolyte layer |

TABLE 1-continued

| | | | | | |
|---|---|---|---|---|---|
| Characteristics | Leveling performance | C | D | A | A |
| | Close adherence strength | C | D | A | A |
| | Output characteristics | C | D | — | — |
| | High-temperature cycle characteristics | C | D | — | — |

*1 In Examples 1 to 7 and 9 to 14 and in Comparative Examples 1 to 3, proportional contents (proportions of charged amounts) of monomers in the monomer composition are equal to proportional contents of monomer units in the polymer. In Example 8, proportional contents of monomer units in the polymer are as shown.
*2 Additive amounts of anti-aging agents are based on 100 parts by mass of solid content of the reaction liquid after polymerization of the monomer composition.

As demonstrated by Examples 1 to 12, it was confirmed that a slurry composition for a negative electrode in which the presently disclosed binder composition for an all-solid-state secondary battery is used has excellent leveling performance and close adherence, and that an all-solid-state secondary battery having excellent output characteristics and high-temperature cycle characteristics is obtained by using this slurry composition for a negative electrode. Moreover, it was confirmed in Examples 13 and 14 that excellent leveling performance and close adherence are also obtained when the presently disclosed binder composition for an all-solid-state secondary battery is used in a slurry composition for a positive electrode and a slurry composition for a solid electrolyte layer.

In Comparative Example 1 in which a binder composition that did not contain an anti-aging agent was used, output characteristics and high-temperature cycle characteristics of the obtained all-solid-state secondary battery were poor.

Although anti-aging agents were used in Comparative Examples 2 and 3, the binder deviated from the scope of the present disclosure and had poor leveling performance and close adherence strength. Moreover, the obtained all-solid-state secondary battery had poor output characteristics and high-temperature cycle characteristics.

The invention claimed is:

1. A binder composition for an all-solid-state secondary battery comprising a polymer, an anti-aging agent, and an organic solvent, wherein
the polymer includes a (meth)acrylic acid ester monomer unit in a proportion of not less than 25 mass % and not more than 95 mass % and a hydrophobic monomer unit in a proportion of not less than 3 mass % and not more than 15 mass %, and has a gel content of 50 mass % or less, and
the anti-aging agent is contained in an amount of not less than 0.005 parts by mass and not more than 0.5 parts by mass per 100 parts by mass of the polymer.

2. The binder composition for an all-solid-state secondary battery according to claim 1, wherein the polymer further includes an α,β-unsaturated nitrile monomer unit.

3. The binder composition for an all-solid-state secondary battery according to claim 2, wherein the α,β-unsaturated nitrile monomer unit constitutes a proportion of not less than 2 mass % and not more than 30 mass % in the polymer.

4. The binder composition for an all-solid-state secondary battery according to claim 3, the =,β-unsaturated nitrile monomer unit constitutes a proportion of not less than 15 mass % and not more than 30 mass % in the polymer.

5. The binder composition for an all-solid-state secondary battery according to claim 1, wherein the anti-aging agent is at least one selected from the group consisting of a phenolic anti-aging agent and an organophosphorus anti-aging agent.

6. A slurry composition for an all-solid-state secondary battery solid electrolyte layer comprising: the binder composition for an all-solid-state secondary battery according to claim 1; and a solid electrolyte.

7. A slurry composition for an all-solid-state secondary battery electrode comprising: the binder composition for an all-solid-state secondary battery according to claim 1; a solid electrolyte; and an electrode active material.

8. An electrode for an all-solid-state secondary battery comprising an electrode mixed material layer formed using the slurry composition for an all-solid-state secondary battery electrode according to claim 7.

9. The binder composition for an all-solid-state secondary battery according to claim 1, wherein the organic solvent is one or more selected from the group consisting of an aromatic hydrocarbon, an ether, and an ester.

10. A solid electrolyte layer for an all-solid-state secondary battery formed using a slurry composition for an all-solid-state secondary battery solid electrolyte layer comprising a binder composition for an all-solid-state secondary battery; and a solid electrolyte,
wherein the binder composition for an all-solid-state secondary battery comprises a polymer, an anti-aging agent, and an organic solvent,
wherein the polymer includes a (meth)acrylic acid ester monomer unit in a proportion of not less than 25 mass % and not more than 95 mass % and a hydrophobic monomer unit, and has a gel content of 50 mass % or less, and
wherein the anti-aging agent is contained in an amount of not less than 0.005 parts by mass and not more than 0.5 parts by mass per 100 parts by mass of the polymer.

11. An all-solid-state secondary battery comprising: the solid electrolyte layer for an all-solid-state secondary battery according to claim 10.

12. The solid electrolyte layer for an all-solid-state secondary battery according to claim 10, wherein the organic solvent is one or more selected from the group consisting of an aromatic hydrocarbon, an ether, and an ester.

* * * * *